(12) United States Patent
Pangels et al.

(10) Patent No.: US 6,336,051 B1
(45) Date of Patent: Jan. 1, 2002

(54) AGRICULTURAL HARVESTER WITH ROBOTIC CONTROL

(75) Inventors: Henning Pangels; Thomas Pilarski, both of Pittsburgh; Kerien Fitzpatrick, Sewickley; Michael Happold, Pittsburgh; Mark Ollis, Pittsburgh; William Whittaker, Pittsburgh; Anthony Stentz, Pittsburgh, all of PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 09/648,741

(22) Filed: Aug. 28, 2000

Related U.S. Application Data (63) Continuation of application No. 09/060,179, filed on Apr. 15, 1998
(60) Provisional application No. 60/079,160, filed on Mar. 24, 1998, and provisional application No. 60/042,003, filed on Apr. 16, 1997.

(51) Int. Cl.[7] .............................................. G05B 13/02
(52) U.S. Cl. ........................... 700/50; 700/50; 700/213; 700/207; 700/245
(58) Field of Search .......................... 700/95, 245, 209; 701/50, 213, 207, 208, 23; 318/568

(56) References Cited

U.S. PATENT DOCUMENTS

| | | | |
|---|---|---|---|
| 3,946,825 A | 3/1976 | Gail | 180/401 |
| 4,126,984 A | 11/1978 | Gail | 56/10.2 R |
| 4,482,960 A | 11/1984 | Pryor | 701/28 |
| 4,532,757 A | 8/1985 | Tutle | 56/328.1 |
| 4,700,301 A | 10/1987 | Dyke | 701/25 |
| 4,726,175 A | 2/1988 | Day et al. | 56/10.2 F |
| 4,868,752 A | 9/1989 | Fujii et al. | 701/28 |
| 5,279,068 A * | 1/1994 | Rees et al. | 47/1.7 |
| 5,442,552 A | 8/1995 | Slaughter et al. | 701/50 |
| 5,444,965 A | 8/1995 | Colens | 56/10.2 A |
| 5,528,888 A | 6/1996 | Miyamoto et al. | 701/50 |
| 5,544,474 A * | 8/1996 | Finkelstein | 56/10.2 A |
| 5,809,440 A * | 9/1998 | Beck et al. | 701/50 |
| 5,828,971 A | 10/1998 | Dickhans et al. | 701/41 |
| 5,899,950 A * | 5/1999 | Milender et al. | 701/50 |
| 5,906,647 A * | 5/1999 | Zyburt et al. | 701/24 |
| 6,070,673 A * | 6/2000 | Wendte | 172/2 |
| 6,101,795 A * | 8/2000 | Diekhans | 56/10.2 F |

OTHER PUBLICATIONS

Willie Vogt, "Robo–Crop", Jan. 1996—*Farm Futures*.
Henry J. Holcomb, "Robo–Crop", Jul. 11, 1996, *The Philadelphia Inquirer*.
"Demeter: An Autonomous Alfalfa Harvesting System", 1996 ASAE Annual International Meeting, Jul. 14–18, Paper No. 963005.

* cited by examiner

Primary Examiner—Ayaz Sheikh
Assistant Examiner—Firmin Backer
(74) *Attorney, Agent, or Firm*—Griffin & Szipl, P.C.

(57) ABSTRACT

An agricultural harvesting machine (harvester) is automatically controlled and steered so as to completely harvest all crop in a field. A Global Positioning System (GPS) and an Inertial Navigation System provide data regarding the position and orientation of the harvester in a field. A Field Coverage Planner constructs a field coverage plan which defines a path for the harvester to follow in cutting crop from a field. Video images of the field in front of the harvester are derived alternately from two video cameras mounted on opposite sides of the harvester. The video images are processed in a Video Processing Computer to detect the crop line between cut and uncut crop and generate steering signals for steering the harvester along the crop line. Video images are also processed to detect the end of a row at the end of a field and supply a measure of the distance to the end of the row. When the end of a row is reached, the harvester executes a 180° spin turn and traverses the field in the opposite direction.

19 Claims, 8 Drawing Sheets

AGRICULTURAL HARVESTER WITH ROBOTIC CONTROL

RELATED APPLICATIONS

This application is a continuation of application Ser. No. 09/060,179 filed Apr. 15, 1998 which claimed benefit of provisional applications No. 60/042,003 filed Apr. 16, 1997 and 60/079,160 filed Mar. 24, 1998.

FIELD OF THE INVENTION

The present invention relates to agricultural machines and more particularly to harvesting machines which, as part of the harvesting process, cut the crop or the plants on which the crop was grown. The invention provides an automatic steering control capable of locating the crop line between cut and uncut crop, steering the harvesting machine along the crop line as it traverses a field, sensing the end of a crop row and, upon reaching the end of the crop row, controlling the turning of the harvester to begin a new traverse of the field.

BACKGROUND OF THE INVENTION

In recent years many of the functions of harvesting machines normally controlled manually by an operator have been automated. Audible and visual sensing by the operator have been replaced with optical, sonic, magnetic, radio frequency and other types of sensors. Microprocessors operating in response to conditions sensed by the sensors have replaced manual operator control of the mechanical functions. However, it is still necessary to have an operator for steering the harvester to (1) move along a crop line, (2) turn the harvester when the end of a crop row has been reached, and (3) avoid obstacles which may be present in the field.

If the need for an operator can be eliminated, it would not be necessary to provide a cab for the harvester or the many operator comfort features such as air conditioning, stereo, etc. now provided on many harvesters.

Even if the need for an operator is not completely eliminated, it is still desirable to provide some form of automated steering or "cruise control" to lessen the burden on the operator and increase the efficiency of utilization of the harvester. While an operator may easily steer a harvester along a crop line at speeds of about 4 to 5 miles an hour, the constant attention required to accomplish this is extremely tiring and an operator can not maintain this speed for long periods of time. The efficiency of utilization of the harvester could be increased by providing a form of cruise control which steers the harvester along a crop line at the maximum harvester speed and either stops the harvester or signals the operator to take over manual control of the steering as the harvester approaches the end of a crop field.

SUMMARY OF THE INVENTION

The invention provides a robotic control system for an agricultural harvester, the robotic control system comprising an execution monitor module which is sequenced through a plurality of finite states by trigger messages from a field coverage planner module, a global trajectory tracker module, a controller module, an end of row detector module and a field coverage monitor module, the execution monitor module activating at least one of the field coverage planner module, the global trajectory tracker module, the end of row detector module, a crop line tracker module or a local trajectory tracker module in each finite state so as to generate steering signals for steering the harvester along a path specified by a field coverage plan to cut all crop in a field.

The global trajectory tracker module generates votes indicating the preferred direction the harvester should be steered so as to follow the path and the crop line tracker module generates steering votes on the direction the harvester should be steered to follow a crop line between cut and uncut crop, the system further comprising a continuously running steering arbiter module for developing steering commands from all the steering votes, and a continuously running controller responsive to the steering commands for developing signals to differentially drive front wheels of the harvester to steer it.

According to one aspect of the invention, the robotic control system includes at least one and preferably two alternately active video cameras mounted on the harvester for viewing the changing scene in front of the harvester and producing images thereof as the harvester moves along the planned path, a frame grabber for grabbing one image at a time from the active camera, and a video processing computer for analyzing each image pixel by pixel according to a color discriminant function to locate a crop line between cut and uncut crop, the color discriminant function being adaptively updated by computing, as the discriminant used in analyzing one image, the Fisher linear discriminant in RGB space between the cut and uncut pixel classes for the preceding image. Prior to analyzing each image to locate the crop line, the image may be compensated for shadows.

According to another aspect of the invention, the robotic control system includes at least one and. preferably two alternately active video cameras mounted on a harvester for viewing the changing scene in front of the harvester and producing images thereof as the harvester moves along the planned path, a frame grabber for grabbing one image at a time from the active camera, and a video processing computer for analyzing each image pixel by pixel and scan line by scan line to locate, for each scan line, a crop line point between cut and uncut crop if there is a crop line imaged in the scan line, and determining which scan line is most likely imaging the end of a crop row.

According to a further aspect of the invention, the robotic control system includes at least one and preferably two alternately active video cameras mounted on a harvester for viewing the changing scene in front of the harvester and producing images thereof as the harvester moves along the planned path, a frame grabber for grabbing one image at a time from the active camera, and a video processing computer for analyzing each image pixel by pixel to determine the probability that a region of the image surrounding each pixel is imaging an obstacle in the path of the harvester.

DESCRIPTION OF PREFERRED EMBODIMENTS

System Hardware.

Figure 1:
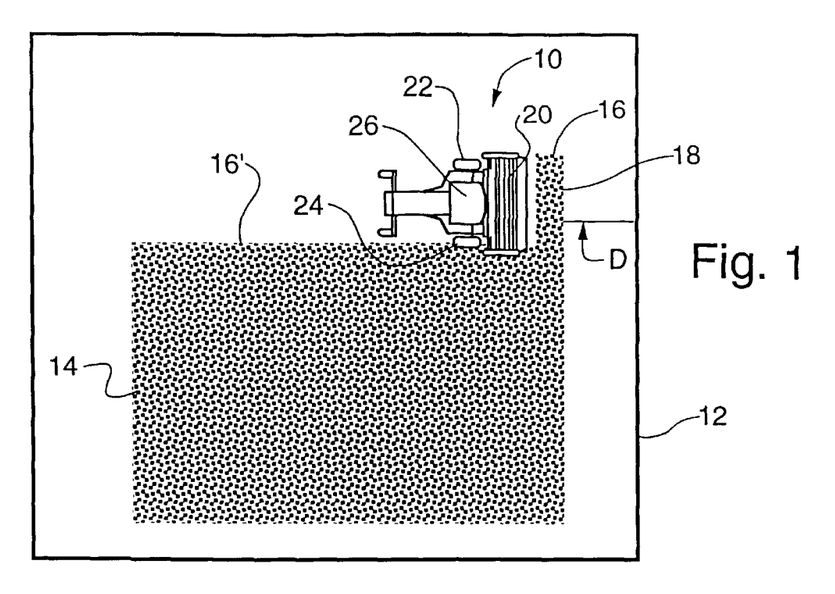
FIG. 1 illustrates a harvester moving over a field in which a portion of the crop has been cut.

FIG. 1 illustrates an agricultural harvester 10 in the process of cutting a crop in a field having a boundary 12. The uncut portion of the crop is indicated by the shaded area 14. The edge or division between the cut crop and the uncut crop in front of the harvester is generally referred to as the crop line and is designated by the reference numeral 16. Conventionally, the entire area of the field is not planted with crop. A headland having a width D is left unplanted at each end of the field and provides an area in which the harvester may turn around. The division between the headland and that portion of the field planted with crop is generally referred to as the "end of row" and is designated by the reference numeral 18. The invention is not limited to use in rectangular fields and the crop area to be cut may be irregular in shape.

The harvester 10 may take many forms (combine, forage harvester, etc.) but experimentation was carried out using a model 2550 Speedrower™ sold commercially by New Holland North America Inc. This harvester is similar to the one described in U.S. Pat. No. 5,327,709 and has a cutter bar (not shown) which may be raised and lowered and which is carried slightly above ground level at the front of the harvester when cutting crop. A reel 20 sweeps the cut crop material into conditioning rolls (not shown) for further conditioning, and the conditioned crop is then discharged from the rear of the harvester in a windrow.

The commercially available harvester is retrofitted with left and right wheel encoders 28,30 (FIG. 2) on its front wheels 22,24. In addition, left and right wheel drive motors 32 and 34 (FIG. 2) and an electrically controlled hydrostatic transmission 35 are added for differentially and reversibly driving the front wheels 22,24. The harvester, as thus modified, is steered by driving the front wheels at different relative speeds. In the test model, a throttle control 36 was implemented as the combination of a small electric motor, electromagnetic brake and a spring loaded cable (not shown), but in a commercial embodiment it is anticipated that a throttle actuator of conventional design will be used. Implement or cutter bar control 38 comprises a conventional solenoid-actuated hydraulic valve (not shown) for raising or lowering the cutter bar. The conventional operator-actuated controls 40 are retained in the illustrated embodiment but, as discussed below, these controls may be eliminated in an embodiment which permits operation of the harvester without a human operator.

Figure 2:
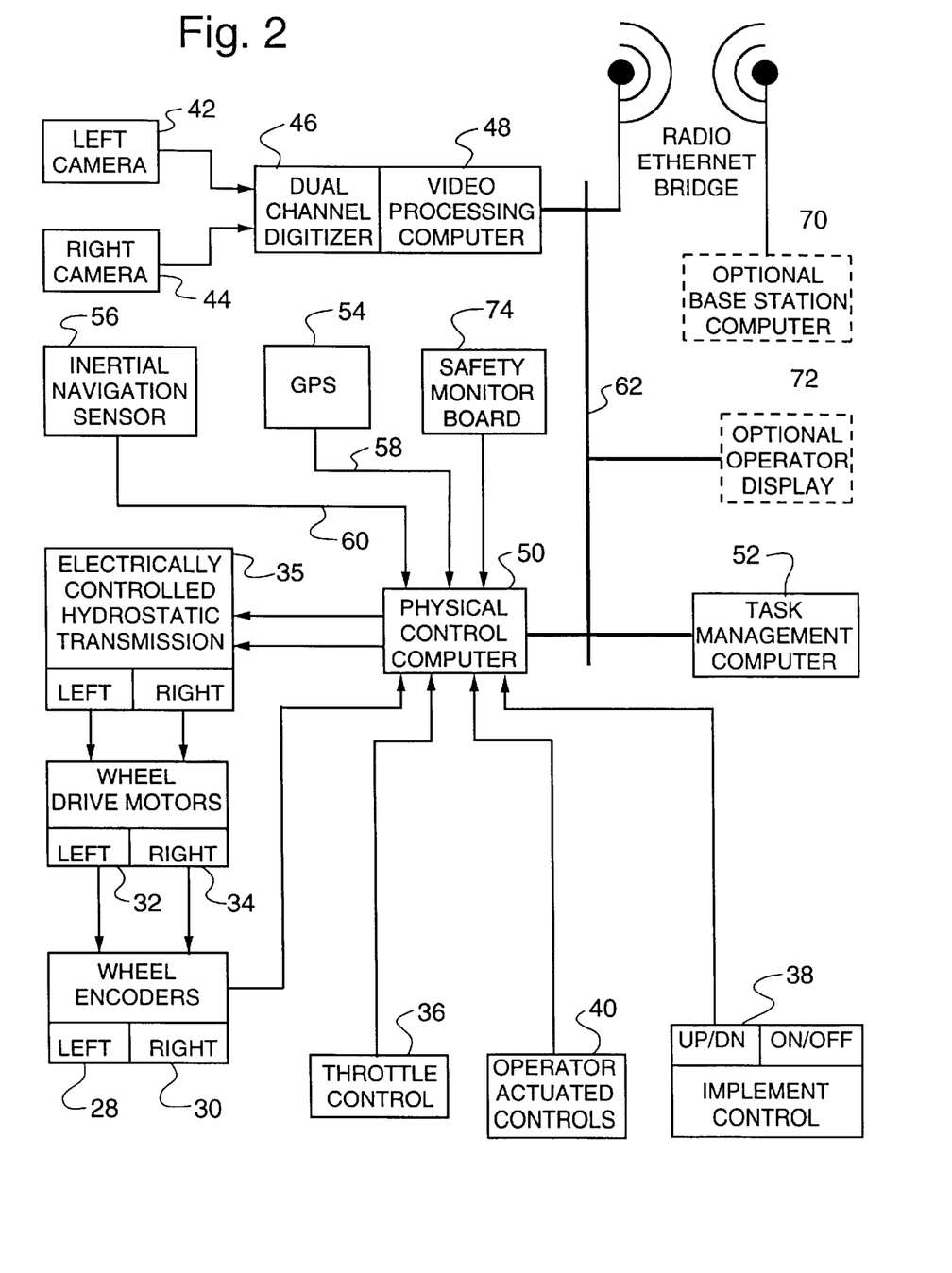
FIG. 2 is a schematic block diagram of the hardware comprising the harvester control system according to a preferred embodiment of the invention.

Wheel encoders 28,30 are of conventional design and may be any type of encoder capable of producing on the order of 10,000 counts or pulses per wheel revolution. The output signals from the wheel encoders are applied to a Physical Control Computer (PCC) 50 which computes the vehicle speed from these signals.

The harvester 10 is provided with at least one video camera 42 (FIG. 2) mounted on an arm extending outwardly from one side of the harvester. The camera 42 is supported by an arm mounted near the top of the operator's cab 26 and extending to the left side of the harvester at a height of about 4m above the ground. The camera 42 is supported so as to be slightly inboard with respect to the left end of the harvester cutter bar and is aimed so as to capture an image of the landscape in front of the harvester. Thus, if the harvester is steered so that the camera remains essentially over the crop line the cutter bar will slightly overlap the crop line. This insures that narrow strips of uncut crop material are not left on the field.

Since the camera 42 is supported over the crop line, use of this camera only would restrict the field coverage plans or patterns of movement which the harvester may be instructed to follow in cutting a field. For example, when the harvester has a single camera mounted on the left side of the operator's cab 26 so as to track crop line 16 (FIG. 1), it is not possible when the harvester reaches the end of the row to turn the harvester 180° about the right front wheel 26 as a pivot and resume cutting. The new crop line 16' will be to the right of the harvester but the camera is still on the left side. Therefore, in a preferred embodiment a second camera 44 is mounted on the right side of the harvester and a dual channel digitizer and frame grabber 46 is controlled to select the video output signal from the appropriate camera.

Cameras 42 and 44 need not be video cameras but may be any form of device capable of detecting the crop height or spectral distribution as discussed by Ollis and Stentz in Proceedings of IEEE Conference on Robotics and Automation (ICRA'96), April 1996, pp. 951–956. However, in a preferred embodiment the cameras are RGB video cameras equipped with auto-iris lenses. CCD color cameras manufactured by Sony Corporation were used in developing the invention. The cameras are calibrated, using the method described by Tsai in the IEEE Journal of Robotics and Automation, Vol. RA-3, No. 4, August 1987, pp. 323–344, to convert image pixel coordinates into real world positions within the scenes viewed by the cameras.

The video output signals from camera 42 and 44 are fed to the dual channel digitizer 46 which is controlled by software commands from a Task Management Computer (TMC) 52 to alternately select the output signal from one camera or the other. At a frequency of about 5–6 Hz, the digitizer grabs a frame of the signal and digitizes it for further processing by the Video Processing Computer 48. VPC 48 analyzes the signal as subsequently described to track a crop line, detect the end of a row, detect obstacles in the path of the harvester, and locate a crop line after the harvester has made a turn in a headland.

A Global Positioning Satellite (GPS) receiver 54 and an Inertial Navigation System (INS) 56 are connected to the PCC 50 via serial RS-232 links 58 and 60, respectively. The computers 48, 50 and 52 are interconnected by a serial Ethernet link 62.

PCC 50 and the TMC 52 may, for example, be Motorola MV162 (MC68040-based) computers running VxWorks™. VPC 48 may be a Pentium-II™ based IBM-PC compatible computer running Microsoft Windows™-NT. The GPS 54 receiver may be a NovAtel AG 20 GPS receiver. The INS 56 may be a fiber-optic gyroscope such as the AutoGyro™ sold commercially by Andrew Corporation. The hardware mentioned herein is by way of example only, it being understood that other computers, inertial sensors and GPS receivers may be used in practicing the invention.

Also shown in FIG. 2 are an optional base station computer 70 communicating with computers 48, 50 and 52 via a radio ethernet link, an optional operator display 72, and a safety monitor board 74. In one embodiment, a harvester according to the invention may be completely robotically controlled and need not even have an operator's cab. All control is exercised from the computer 70 and the operator controls 40 and display 72 are not provided.

In a second embodiment, the invention may be implemented in an on-board system which permits automated control of some operations and manual control of other operations by an operator. For example, an operator may manually steer the harvester to the beginning of a crop row and initiate robotic control of crop line tracking, the operator resuming manual control when the end of a row is reached. In this case computer 70 is not required but the operator display 72 and operator controls are provided in the operator's cab.

Figure 3:
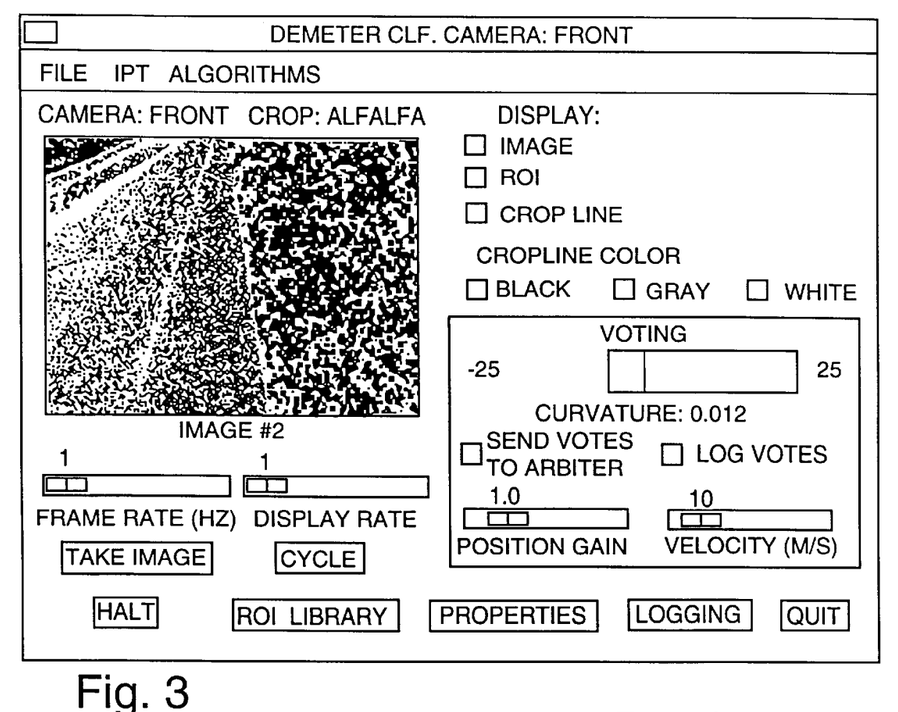
FIGS. 3 and 4 show a display screen displaying a video image of a field ahead of the harvester (FIG. 3) and harvester status information (FIG. 4)
Figure 4:
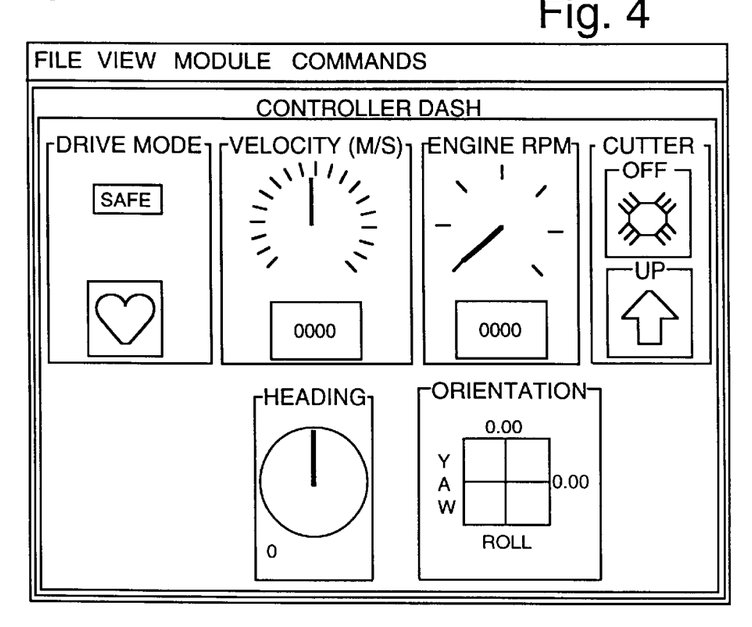

As shown in FIGS. 3 and 4, the display 72 is controllable to display various information such as an image of the scene viewed by a camera (FIG. 3) or various status information (FIG. 4) including cutter status (on/off and up/down), engine RPM, and harvester heading and orientation and operation mode. The display includes various soft keys (FIG. 3) operable to select various data for display, or to set various parameters.

The requirements for the safety monitor 74 vary depending on whether or not provision is made for on-board operator control. The safety monitor detects abnormal status conditions and either stops the harvester or signals the operator when an abnormal condition is detected. The safety monitor, per se, is not a part of the present invention and will not be further described.

The Physical Control Computer 50 continuously monitors the output signals from the wheel encoders 28 and 30 as previously mentioned, and also continuously monitors data originating from the GPS 54 and INS 56. Based on information gathered from these sources, PCC 50 calculates and broadcasts to other modules up-to-date navigation estimates of global (absolute) position, local (relative) position, heading and ground speed.

The global position is expressed in Cartesian coordinates relative to a system-wide pre-defined coordinate system origin. This coordinate system roughly corresponds to the area of the continent where the system is operating, i.e. its origin is reassigned only when the harvester is moved on the order of hundreds of miles. The global position estimate is computed by PCC 50 by updating the GPS information collected from GPS receiver 54 with wheel encoder data collected from wheel encoders 28 and 30 and. This allows more frequent and precise updates than would be available from the GPS alone.

During periods when GPS data is unavailable, the global position estimate is updated solely from data obtained from the wheel encoders 28 and 30. Although the accuracy of the position estimate based solely on wheel encoder data degrades with time and harvester speed, normal performance is restored automatically when the PCC 50 detects that GPS data is again available.

The local position is expressed in Cartesian coordinates relative to an arbitrary coordinate system established or fixed every time the entire control system is started up. This coordinate system can be thought of as the fields in which the harvester is presently operating. The local position estimate is derived from data obtained from the wheel encoders 28 and 30 and INS 56.

The heading broadcast by PCC 50 is a heading expressed relative to the global coordinate system. This heading is derived from a combination of the information obtained from INS 56 and GPS 54.

The Physical Control Computer 50 also processes steering commands received from the Task Management Computer 52 and develops signals for steering the harvester. As described below, a Steering Arbiter program module run by the Task Management Computer 52 develops the steering commands for steering the harvester. A steering command comprises an odd-numbered set of values, limited in magnitude and having values which are the reciprocal of the radius of curvature of the commanded turn. For example, there may be 201 steering commands with command #1 corresponding to a curvature of −0.1 (maximum left turn) and command #201 corresponding to a curvature of +0.1 (maximum right turn). Command #100 in this example would correspond to zero curvature thus steering the vehicle straight ahead.

A steering command produced by Task Management computer 42 is transferred via serial link 62 to the Physical Control Computer 50 which resolves the steering command and generates analog current signals that are fed to electrically controlled hydraulic servo valves in transmission 35. The valves allow proportional amounts of hydraulic power (flow) to drive the wheel drive motors 32 and 34 at their respective desired speeds. The harvester ground speed or velocity is equal to the average value of the left and right wheel speeds while the curvature of its path is proportional to the difference in the wheel speeds. With respect to ground speed, the total hydraulic power available, and therefore the maximum ground speed attainable, is proportional to the harvester engine speed which is determined by the setting of a throttle control 36.

The PCC 50 also issues signals for setting throttle control 36 and actuating implement controls 38. In embodiments of the invention wherein operator-actuated controls 40 are provided to permit an operator to manually control the harvester or over-ride automatic control, signals from the operator-actuated controls are processed by PCC 50 to steer the harvester, set its speed, control the cutter bar, etc.

System Software Overview.

The system of the present invention employs a behavior based approach to control the harvester 10. The system software defines a finite state machine which cycles the harvester through a series of states such as cutting or turning. Each state defines which program modules are active in the state and also defines the trigger events that allow the system to transition from the current state to another state. While in a given state, several executing modules or behaviors are activated or deactivated. Transitions between states are triggered by events signaled by a module. Trigger events may be signaled from all modules within the system.

Figure 5:
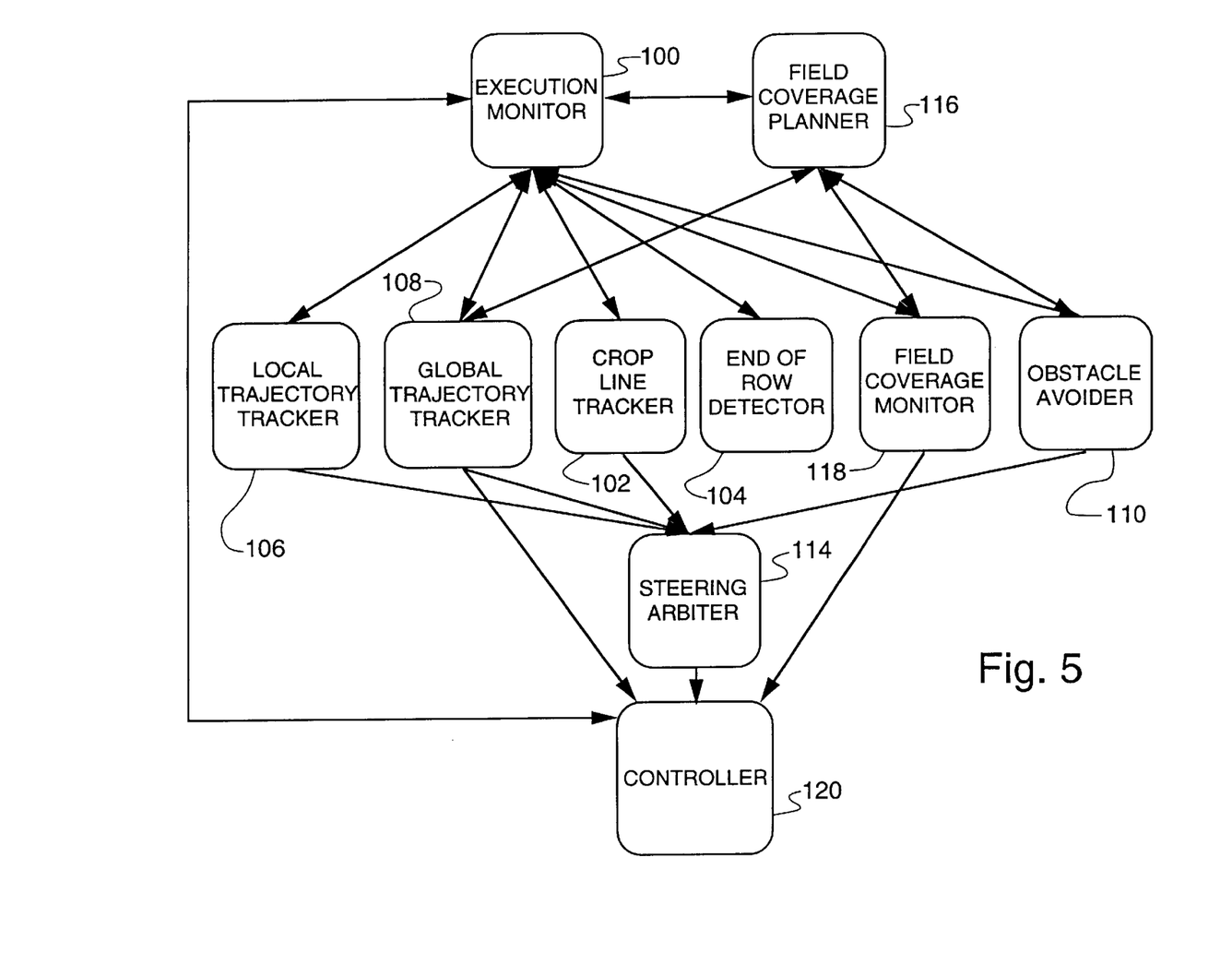
FIG. 5 is a block diagram illustrating the software modules of the control system.

As shown in FIG. 5 the program modules for controlling the harvester comprise an Execution Monitor (EM) module 100, a Crop Line Tracker (CLT) module 102, an End of Row Detector (ERD) module 104, a Local Trajectory Tracker (LTT) module 106, a Global Trajectory Tracker (GTT) module 108, an Obstacle Avoider (OA) module 110, a Steering Arbiter (SA) module 114, a Field Coverage Planner (FCP) module 116, a Field Coverage Monitor (FCM) module 118 and a Controller module 120. The CLT, EOR, and OA modules 102, 104 and 110 are all executed in the Video Processing Computer 48. The EM, LTT, GTT, SA, FCP and FCM modules 100, 106, 108, 114, 116, 118 are all run in the Task Management Computer 52. The Controller module 120 is run in the Physical Control Computer 50. The Steering Arbiter monitor module 114, Field Coverage Monitor module 118, Obstacle Avoider module 110 and Controller module 120 run continuously, that is, concurrently with any other of the program modules.

The Execution Monitor 100 serves as the main control unit for the system and defines the states. The EM 100 sequences through a plurality of states and in each state activates one or more other program modules so as to cut the field according to a field coverage plan specified by the Field Coverage Planner 116. The FCP 116 is supplied with surveyed GPS points which define both the geometry of the field to be cut and the location of any known obstacles in the field. The planner is also supplied with data defining the dimensions of the harvester and its cutting implement, the maximum range of cameras 42 and 44, the harvester position in global coordinates, and the type of path to plan, for example a Path To Land plan, an S-type path, or some other type of path. Commands relating to points result in the initiation of various operations as the harvester reaches each tagged point. For example, a command may specify that the harvester is to move from point A to point B at a given turn radius of curvature and at some specified velocity. When the harvester reaches point B, the next command may specify a turn to a particular heading, possibly a new velocity, and lowering of the cutter bar. The commands may also include such tag information as the optimal cutting width, or trigger messages which result in the activation of other modules by advancing the state of the Execution Monitor module 100.

Figures 6, 7A, 7B:
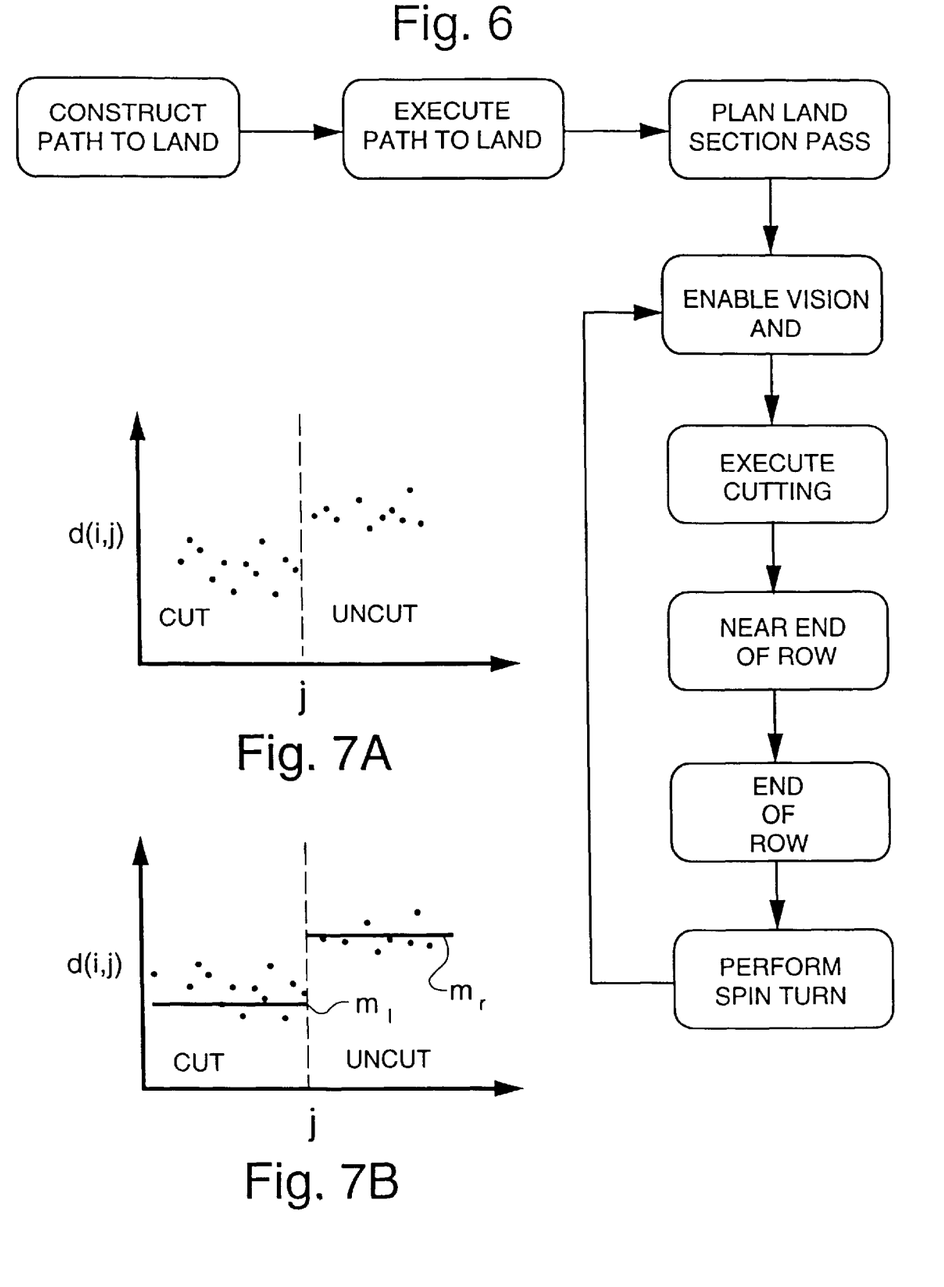
FIG. 6 is a sequence diagram illustrating the sequencing of operations by the Execution Monitor module.
FIGS. 7A and 7B are diagrams useful in explaining the mathematical basis of operation of the crop line tracker.

FIG. 6 illustrates the sequencing of Execution Monitor 100 between 8 states to move the harvester to a land section and cause the harvester to cut crop in the land section by traversing the land section in an S-type pattern, making a 180° turn at the end of each crop row. A land section may comprise an entire field or a section of a field separated from other sections by an irrigation border.

State 1 represents the state of the system when the harvester is at some random position within a field and is planning a path to be traversed by the harvester to get to a certain land section within the field. It is assumed that the field has been surveyed to gather GPS data points which specify the geometry of the field, and these GPS data points have been processed by the FCP module 116 to divide the field up into land sections. In State 1 the EM module 100 instructs the FCP module 116 to plan a path to the next unprocessed land section within the field. Once FCP module 116 has constructed the path, herein referred to as the Path To Land or PTL plan, it signals a trigger message to EM module 100 which then advances to State 2.

In State 2, EM module 100 activates the GTT module 108 and instructs it to execute the PTL plan. When activated, the GTT module retrieves the PTL information from the FCP module 116 and begins executing the plan as later discussed in greater detail. Once the GTT module has completely executed the PTL plan, the module signals a trigger message to EM module 100 which then advances to State 3.

Upon entering State 3, EM module 100 deactivates GTT module 108 and instructs the FCP module 116 to plan an S cut pattern for the given land section. Once the pattern has been planned, the FCP module first sends a message to the Crop Line Tracker module 102 informing the CLT module of the optimal cutting width to use when cutting the present land section. The FCP module 116 then sends a trigger message to EM module 100 to advance it to State 4.

In State 4, the EM module 100 activates both the GTT module 108 and the CLT module 102. The GTT module retrieves the S cut pattern to be tracked from the FCP module 116 and immediately begins tracking the path. That is, the GTT module starts generating steering votes (discussed later) which it sends to the Steering Arbiter module 114. As previously Stated, the SA module 114 and the Controller module 120 are always active so the steering votes are converted, via modules 114 and 120, into signals which are fed to the transmission 35 (FIG. 2) to steer the harvester along the S path.

When the CLT module 102 is activated, it first retrieves from FCP 116 an indication of whether to activate the left camera 42 or right camera 44 in order to track the crop line. The CLT module then begins processing images from the activated camera to find a crop line and to ultimately generate steering votes which are sent to SA module 114 to keep the harvester cutting crop with the appropriate cutting width sent to the CLT module during State 3.

In State 4, the EM module 100 also instructs Controller module 120 to prepare for cutting. The Controller module enables an autonomous mode allowing the software system to take over control of harvester motion, set the throttle up to a level appropriate for cutting, and turn on and lower the cutting implement. Once the controller has performed all of these functions it sends a trigger message to the EM module 100 to advance the EM module to State 5.

In State 5, the EM module 100 keeps the GTT and CLT modules active and both modules continue to produce the steering votes for steering the harvester. The EM module also instructs the Controller module 120 to slowly ramp up the speed to the optimal cutting speed for the present field and field conditions. Upon receipt of this instruction the Controller module starts ramping the speed of the harvester up to the requested speed. Upon reaching the requested speed, the controller holds this speed unless it is subsequently instructed to change speed.

As noted earlier, the Field Coverage Monitor 118 runs continuously. One of its purposes is to monitor progress of the harvester along the S path planned by the Field Coverage Planner 116. When the FCM module 118 detects that the harvester is at, or has just passed, a tagged point on the path specifying that the harvester is near the end of the crop row, the module sends a trigger message to the EM module 106 to advance it to State 6.

In State 6, the EM module 100 keeps the GTT and CLT modules active and both of these modules continue to produce steering votes to keep the harvester on the S path. The EM module also activates the End of Row Detector module 104 which begins processing images from the active camera to detect the end of the row.

The EM module is advanced from State 6 to State 7 only when it receives a trigger message telling it that the harvester is at the end of the row. This trigger message can from either the Field Coverage Monitor module 118 or the End of Row Detector Module 104. If the software determines that it has a good and valid global position the EM module 100 expects the end of row trigger message to come from FCM module 118 which will send the trigger message as a result of monitoring the progress along the specified path. Once the FCM module 118 detects that the harvester has reached the point along the path that is tagged the end of row point for that cutting pass, the FCM module sends the trigger message to EM module 100.

On the other hand, if the global position is not valid due to a detected GPS dropout, the FCM module 118 can not trust the global position data and is therefore unable to determine when the harvester is at the end of the row. In this case the EM module 100 expects the end of row trigger message to come from the End of Row Detector module 104 which sends the trigger message along with a measure of the distance from the point of detection of the end of row to the actual end of the row.

Upon entering State 7, the Execution Monitor module 100 deactivates the CLT and ERD modules 102 and 104, and instructs the Controller module 120 to lift the cutting implement. Then, based on whether or not the system has a valid global position, the EM module 100 either advances to State 8 immediately (global position not valid) or waits to receive a trigger message from the FCM module 118 when the FCM module detects that the harvester is at the point tagged to be a spin turn point on the path. In State 8 the harvester performs a 180° spin turn about one front wheel to get the harvester aligned with the next crop row. Depending on the status of the GPS, this turn is controlled by either the Local Trajectory Tracker module 106 (global position not valid) or the Global Trajectory Tracker 108 (global position valid). This completes the cutting of one row and turning of the harvester at the end of the row.

After the spin turn has been completed, the module 106 or 108 that controlled the turn sends a trigger message to EM module 100 to transition the EM module back to State 4. The EM module is again sequenced through States 4–8 to cut the next row and again turn the harvester. Once the crop in the land section has been harvested, the EM module is returned to State 1 to determine if there are any more land sections to be processed. If so, the FCP module constructs the Path To Land path necessary to guide the harvester to the new land section.

Field Coverage Planner.

As previously mentioned, the Field Coverage Planner 116 module plans a path for the harvester to follow. The path may be either a Path To Land path to move the harvester (1) from its current position to the end of the first row, (2) from the end of the last row of one land section to the first row of another land section, or (3) a coverage path such as an S-type path. In order to plan a path, the FCP requires, as input data, the type of plan it is to construct, surveyed GPS points which define both the geometry of the field and the location of known obstacles, including irrigation ditches within the field, the dimensions of the harvester and its cutting instrument, the maximum range of the cameras 42 and 44 and the current position of the harvester in global coordinates. From this data the FCP 116 constructs a path made of points which are tagged with position, velocity, curvature, trigger and other information, the points being with respect to the global reference frame.

When planning an S cut pattern for a land section, the FCP module computes the switchback path which requires the least number of passes while assuring that the land section is completely harvested. When planning a Path To Land path, the FCP module computes the shortest path to get the harvester from its current position to the specified land section while avoiding obstacles and uncut crop. If a camera 42 or 44 detects an unexpected obstacle, for example a piece of machinery, or if the FCP module is notified by the Field Coverage Monitor module 118 that the harvester has deviated too far from the planned path, the FCP module plans a new path from the present position of the harvester to the original goal. FCP 116 merely plans a path, it does not execute the plan.

Field Coverage Monitor.

The FCM module 118 functions as a safety monitor. The inputs to this module are the geometry of the field the harvester is operating in, the planned path from the FCP 116, and a maximum path tolerance value. The FCM module monitors the position of the harvester within the field at all times and if the harvester deviates from the planned path, or is found to be too close to an obstacle or an outer border of the field, the FCM module sends a halt command to the Controller module 120 to actuate the throttle control 36 to immediately stop the harvester.

Since the FCM module already monitors the harvester position with respect to the planned path for safety reasons, it is also used to check the planned path to determine when the harvester has arrived at a tagged point along the path. When the FCM module determines that the harvester is at a tagged trigger point along the planned path, it sends the trigger message associated with the tagged point to the EM module 100.

Global Trajectory Tracker.

The GTT 108 receives the current harvester position from Controller module 120 and the path to track from the Field Coverage Planner 116. From this information it generates steering commands which are sent to Steering Arbiter 114 to steer the harvester along the planned path and velocity commands which are sent to Controller module 120 for execution. If the path being tracked is a Path To Land plan, GTT 108 also sends point turn commands to Controller module 120.

Local Trajectory Tracker.

The LTT module 106 receives as inputs the current position of the harvester, in local coordinates, and the planned path. From this data it generates velocity commands which are applied to the Controller module 120 and steering commands or votes which are applied to the Steering Arbiter module 114. The LTT module uses an adaptive pure pursuit tracking algorithm to generate steering commands allowing the harvester to accurately track the planned path. While tracking the path the LTT module monitors the tagged velocity points along the path planned. If the velocity of the harvester is found to be greater than what is specified in the plan the LTT module issues a command to Controller module 120 instructing it to set the velocity to the velocity value of the tagged path point the harvester is currently on.

Crop Line Tracker.

The purpose of the CLT module 102 is to analyze the video signal representing the scene, or a portion of a scene, within the field of view of the active camera 42 or 44 and generate an indication of where the crop line is relative to the center of the scene.

The CLT module 102 comprises a discriminator and a segmenter, as described in the publication mentioned above, discrimination between cut and uncut crop being based on the ratio between two spectral bands (red/green) or the percentage intensity of green within a given spectral band. The discriminator computes from the digitized output signal of a camera a function $d(i,j)$ of individual pixels within a window or region of interest of say about 400 pixels wide by about 480 pixels located at or near the center of the video camera imaging screen.

FIG. 7A represents a plot of $d(i,j)$ for a portion of one scan line near the center of the scan line, the discriminant being green percentage intensity. For each pixel position j the discriminator produces an output signal having a magnitude i related to the percentage green intensity at the pixel position. Because of the foliage on the uncut crop, the $d(i,j)$ are clustered about a first mean value $m_r$ (FIG. 7B) for uncut crop and about a second mean value $m_l$ for cut crop. FIG. 7B suggests a step function defined by three parameters: $j_d$, the j coordinate of the discontinuity; $m_l$, the mean value of the step function to the left of the discontinuity; and $m_r$, the mean value of the step function to the right of the discontinuity. Finding the best segmentation is thus a matter of finding the best fit step function (lowest least-squared error) to $d(i,j)$ along a given scan line.

The segmenter may determine $j_d$ according to the following algorithm.

```
smallest_error = infinity
for each possible j_d from j_min to j_max
    compute m_l
    compute m_r
    compute error
    if (error < smallest_error)
        smallest_error = error
        best_j_d = j_d
    end if
end for
```

Preferably, the segmenter computes $j_d$ according to the equation:

$$f(j_d) = \left(e(j_d)(j_{max} \cdot 1)^2 - \sum_{j=0}^{j_{max}} d(i, j)\right)$$

where e is the error.

Figure 8:
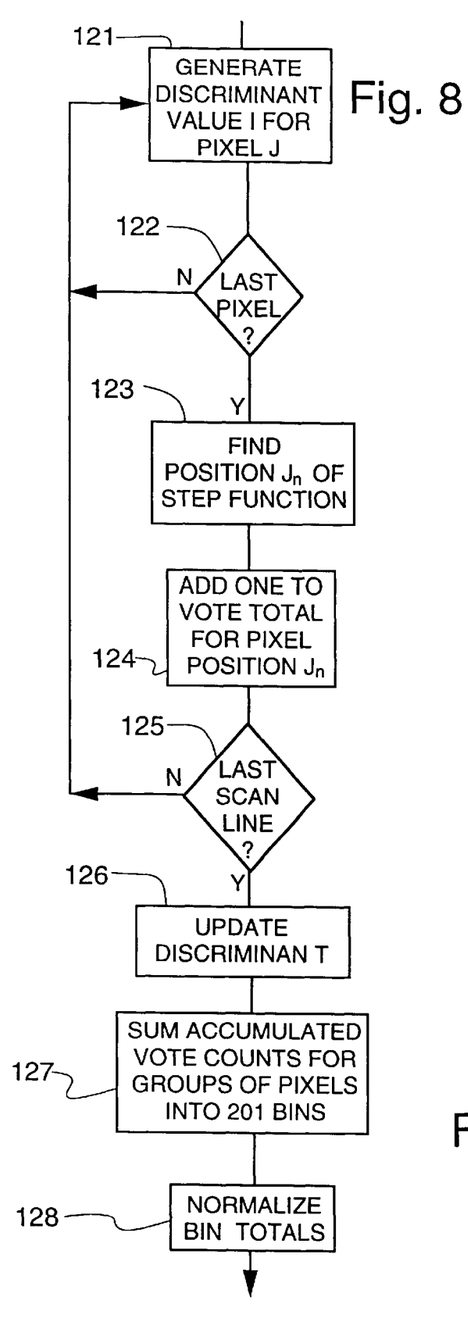
FIG. 8 is a flow chart illustrating the operation of the Crop Line Tracker module.

Referring to FIG. 8, the discriminator portion of CLT 102 analyzes a pixel according to the discriminant function at step 121 and generates and saves a value i for that pixel. Step 122 determines if this is the last pixel to be examined in the current scan line and if it is not the last pixel, step 121 is executed to develop a discriminant value i for the next pixel. Assuming the window being analyzed is 400 pixels wide, steps 121 and 122 are repeated 400 times to develop and save 400 values $i_1$–$i_{400}$. At step 123 the segmenter computes a best fit step function for these values. The location of the step defines a pixel location $j_n$ which in turn represents the location of the crop line as determined from the current scan line. The segmenter output signal is a binary signal having a bit position corresponding to each pixel on a single scan line and within the region of interest. The signal has in it a single 1-bit in the position corresponding to the computed step function pixel location $j_n$. This bit represents a crop line tracker "vote" on the steering angle or direction in which the harvester should be steered so as to track the crop line.

Ideally, the votes on the steering direction should be in the same bit position of each output signal if the harvester is tracking the crop line. However, in actual practice cropless bare spots, areas of poor or dead crop, and other anomalies cause the votes to be distributed among different bit positions for different scan lines. An accumulator is provided for each pixel position and at step 124 the vote generated at step 123 is added into the accumulator which accumulates votes for pixel location $j_n$.

The segmenter produces one output signal or vote for each scan line within the window or region of interest. Step 125 determines if the last scan line of the window has been processed. If the last scan line has not been processed, a return is made to step 121 and steps 121–124 are repeated to develop a vote on the steering direction for the next scan line. Step 125 detects when all 480 scan lines of the image within the window have been processed.

At this point the crop line tracker has developed 480 votes on the steering direction, these votes being distributed among 400 vote accumulators. At step 127 the votes for groups of adjacent pixel positions are collected into 201 bins and at step 128 the bin vote counts are normalized. Thus, for each image the CLT module produces 400 normalized votes on the steering direction, each normalized vote having a value between 0.0 and 1.0 and the sum of the normalized votes being 1. The normalized votes for pixel positions 1 to 200, that is the pixel positions to the left of the center pixel of the window, are assigned negative values so that these votes are votes for steering the harvester to the left of its present course. The normalized votes are supplied to the Steering Arbiter module 114 run in the Task Management Computer 52, and further processed by SA module 114 as described below to develop a steering command which is supplied to the PCC 50 where it is resolved to develop the analog signals controlling differential drive of the front wheels of the harvester.

When TMC 52 receives a set of normalized votes from the CLT module 102 run in VPC 48, the TMC 52 sends a signal to the digitizer 46 so that the digitizer grabs another frame of the video signal from camera 42 or 44 for processing by the CLT module.

The size of the window used in the crop line detector need not be 400×480 pixels and it is not necessary to process every pixel position of an image within a window. For example, the window may be made smaller or, if the crop is relatively uniform over the field and is easy to discriminate from the cut portion of the field, the processing of every third or fourth pixel may be eliminated to reduce signal processing time in the CLT module.

The CLT module described above may be modified in several ways to improve its performance. Even within a single field, use of a fixed discriminant function such as f=G/R+G+B will not yield a consistently correct segmentation because of changes in light conditions and soil type. To overcome this variability in the environment, the discriminant function is adaptively updated. When step 125 in FIG. 8 indicates that the last scan line has been analyzed, the CLT module 102 computes (step 126) the Fisher linear discriminant (see Pattern Classification and Scene Analysis, J. Wiley & Sons, 1973, pp. 114–118) in RGB space between the cut and uncut pixel classes. This discriminant is then used at step 121 in FIG. 8 as the discriminant for analyzing the next image.

The Fisher discriminant computes a line in RGB space such that when the pixel values are projected onto that line, the ratio of average interclass distance to average interclass scatter is maximized. This results in the linear function which most cleanly separates the cut and uncut pixel classes.

The discriminant function used in processing the first image is chosen arbitrarily and a poor choice may result in inaccurate crop line indications for the first few images as the algorithm converges to more effective discriminant functions. However, when the CLT module 102 has a cycle time of about 5 Hz the crop line indications become quite reliable in about 0.5 second.

The adaptive CLT alogrithm may be summarized as follows.

1. Initialize the color discriminant function: f=1.0 R+1.0 G+1.0 B.
2. Digitize an image.
3. For each scan line of the image:
    a. plot f as a function of image column i.
    b. compute the best fit step function to the plot.
    c. return the location of the step as the crop line boundary estimate or vote on the steering direction.
4. Compute an updated discriminant function using the Fisher linear discriminant.
5. Return to step 2.

The operation of the basic Crop Line Tracker module may also be improved by providing shadow compensation. Shadow "noise" can heavily distort both image intensity (luminance) and color (chrominance), resulting in errors in the crop line indications produced by the module. Shadow noise causes difficulties for a number of reasons. It is often not structured and thus is not well modeled by stochastic techniques. Its effects and severity are difficult to predict. For example, if the sun is momentarily obscured by a passing cloud or the orientation of the harvester changes rapidly, the prevalence and effect of shadow noise can vary dramatically on time scales of less than a minute.

Normalizing for intensity will not solve the problem for two reasons. The primary reason is that it does not take into account the significant color changes present in the shadowed areas. The dominant illumination source for unshadowed areas is sunlight while the dominant illumination source for shadowed areas is skylight. A second reason is that it prevents the tracking algorithm from using natural intensity differences to discriminate between cut and uncut crop.

In an ideal camera, the RGB pixel values at a given image point are a function of the spectral power distribution $S(\lambda)$ emitted by a point in the environment. For example, $$R = r_0 \int S(\lambda) \bar{r}(\lambda) d\lambda$$

where $r_0$ is a scaling factor and $\bar{r}(\lambda)$ is a function describing the response of the CCD chip and red filter of the camera, this function rapidly falling to zero outside a narrow wavelength band. Since $r_0$ and $\bar{r}(\lambda)$ are purely functions of the camera it is merely necessary to construct a model of how shadows alter the function $S(\lambda)$. To a first approximation, $S(\lambda) = I(\lambda)\rho(\lambda)$ where $I(\lambda)$ is the illuminating light and $\rho(\lambda)$ is the reflectance function of the illuminated surface point. If it is assumed that every point in the environment is illuminated by one of two spectral power distributions, either $I_{sun}(\lambda)$ comprising both sunlight and sky light, or sky light alone, then the red pixel values for unshadowed regions will be $$R_{sun} = r_0 \int I_{sun}(\lambda) \rho(\lambda) r(\lambda) d\lambda$$

and the red pixel values for shadowed regions will be $$R_{shadow} = r_0 \int I_{shadow}(\lambda) \rho(\lambda) \bar{r}(\lambda) d\lambda$$

Approximating $(\lambda)$ as a delta function with a non-zero value only at $\lambda_{red}$ and simplifying the equations, $R_{sun}$ and $R_{shadow}$ can be related by a constant factor $C_{red}$, that is, $$R_{sun} = R_{shadow} \frac{I_{sun}(\lambda_{red})}{I_{shadow}(\lambda_{red})} = R_{shadow} C_{red}$$

The same analysis may be repeated for G and B pixel values. Under the assumptions given above, $C_{red}$, $C_{blue}$ and $C_{green}$ remain constant across all reflectance functions $\rho(\lambda)$ for a given camera in a given lighting environment.

The shadow compensation may therefore be implemented by (1) selection of appropriate constants for $C_{red}$, $C_{blue}$ and $C_{green}$, (2) determining whether points are shadowed or unshadowed, and (3) correcting the shadowed pixels using the above equation, that is, multiplying the shadowed pixel values by the respective correction factors. Intensity thresholding is used to determine whether a point is shadowed or unshadowed. Once an image has been compensated for shadows, it is then applied to the discriminator of FIG. 8.

Approximate values for $C_{red}$, $C_{blue}$ and $C_{green}$ were hand selected by experiment, the values being $C_{red}=5.6$, $C_{blue}=2.8$ and $C_{green}=4.0$. These values differ from values calculated a priori from black body spectral distribution models of sunlight and sky light. The difference may be due to inadequacy of the black body spectral distribution function as a model for sky light values and/or the variable sensitivity of the camera CCD to red, green and blue light.

Because the crop line tracking algorithm shown in FIG. 8 segments images on the basis of color differences between the cut and uncut crop, the similarity in color between uncut crop and cut crop lying in a windrow produced by the harvester during the immediately preceding pass occasionally causes poor segmentation. This problem may be remedied by excluding from the image processed by the CLT module that region of the image where the windrow is located. The position of the windrow relative to the ideal crop line may be easily determined from the cut width on the previous pass and knowledge of the average width of a windrow. The distance between the present crop line and the near edge of the windrow left be the previous cut may be computed according to the equation distance=(previous cut width/2)−(average windrow width/2). For the purpose of processing the relevant region of the video image, the cameras must be calibrated as mentioned above to capture the convergence of lines to the horizon as well as correct for camera lens distortion. Converting the real world distance between the crop line and the windrow into image values produces a cut-off line for both the segmenter and the learning phase of the adaptive algorithm. When the harvester is tracking using the left camera, all pixel positions j of the image to the left of this cut-off line are ignored when applying the discriminant function at step 121 of FIG. 8, and when tracking with the right camera those pixel positions j of the image to the right of the cut-off line are ignored.

The harvester may not be lined up perfectly with the crop when it completes a spin turn and this results in a poor crop line for the portion of the image which includes the already cut crop preceding the beginning of the crop. The initial imaged crop line is passed through a crop line assessor or "beginning of crop" detector to determine the position in the image where the uncut crop begins. The crop line assessor computes the regression line and error for each of four equal sections of the crop line. The slope and intercept of each regression line is computed as follows:

$$\text{lope} = \frac{1}{S_{tt}} \cdot \sum_{i=1}^{N} \frac{(t_i \cdot y_i)}{\sigma_i}$$

intercept=$(S_y-(S_x \cdot \text{slope}))/S$ where $$= \sum_{i=1}^{N} \frac{1}{\sigma}$$

$$S_y = \sum_{i=1}^{N} \frac{y_i}{\sigma_i^2}$$

$$S_x = \sum_{i=1}^{N} \frac{x_i}{\sigma_i^2}$$

$$_i = \frac{1}{\sigma_i} \cdot \left( x_i - \frac{S_x}{S} \right)$$

$$_{tt} = \sum t$$

Subsections of the crop line are considered locked onto the crop line if their error is below ERROR_THRESH= 10.0, they are not skewed relative to the regression line for the subsection above them in the image, and the prior line is locked on. A regression line is considered skewed if the difference between its slope and the regression line above it is above SKEW_THRESH=1.5 and the difference between the start point of the current line and the end point of the prior line is less than DISTANCE_THRESH=15 pixels. The top-most subsection of the crop line is most likely to be locked onto the crop hence its regression line is used as the base line for determining the skew of the lower subsections and it is never considered skewed. The beginning of the crop is considered to be at the end of the locked subsection that is lowest in the image.

Experiments have shown that the color discriminants used by the Crop Line Tracker module described above are inadequate for tracking in Sudan grass. Several texture discriminants may be used in place of the color discriminants. This requires an additional step in the processing of the crop line since a texture operator must be convolved with the image to produce a filtered image. A Gabor elementary filter may be used as the texture operator. The Gabor elementary filter is a discrete realization of the function $$e^{(-((x-x_0)^2+(y-y_0)^2))/2\cdot\sigma^2} \cdot \sin(\omega(x \cos \theta - y \sin \theta) + \phi)$$

where $\phi, \theta$, and $\omega$ are the frequency, orientation and phase of the sinusoidal plane wave. The discrete realization forms a kernel that is convolved with the image. Kernels with orientations of 45 and 135 degrees are used. The resulting filtered image is then passed through the same segmentation process (step 123 of FIG. 8) applied to color discriminants. In embodiments of the invention which provide manual operator control, the operator controls 40 may include a switch or selection means to select the texture discriminant when sudan is to be harvested or select the color discriminant when another crop is to be harvested. In embodiments wherein no on-board operator controls are provided, the selection may be made via the off-board base station computer 70 (FIG. 1).

Obstacle Avoider.

The purpose of the Obstacle Avoider module 110 is to detect obstacles in the path of the harvester and, if an obstacle is detected, stop the harvester and signal the operator. Detection is carried out by analyzing, pixel by pixel, an image of the area in front of the harvester (which should be crop) to determine the probability that the region centered around the pixel belongs to a crop model.

A discretized 2D histogram model of the crop is required for the analysis. The model is preferably acquired directly from the field to be cut by grabbing a frame image of the crop to be cut from camera 42 or 44 prior to starting the cutting of the field, the model being updated or trained with each new image. The step function fitting method described with respect to the CLT module 102 is used to generate the training data for building two probability density function (PDFs), one for the processed or cut portion of the field and one for the unprocessed or uncut portion of the field. The PDFs are then combined into a single PDF for both the processed and unprocessed surface. Each pixel in an image is then examined and marked if it has a low probability of representing the processed or unprocessed surface.

Once the histogram model has been obtained (step 150 in FIG. 9) the Obstacle Avoider module 110 continuously repeats a sequence of steps 151–155 as long as no obstacle is detected. At step 151 the obstacle avoider grabs a new image of the area in front of the harvester. That is, the output signal from a camera 42 or 44 representing one image is digitized. The OA module 110 then selects (step 152) a pixel(i,j) that has not been processed. Step 153, using the histogram model and the pixel information for the pixels surrounding the selected pixel (i,j), computes the probability PROB(i,j) of the region of 10×10 pixels within the region centered around the selected pixel belonging to the crop model. PROB(i,j) is obtained by first multiplying together all points m,n within the 10×10 pixel region of i,j. PROB(i,j) is then obtained by dividing the number of points falling into histogram cell for pixel (m,n)'s color by the total number of points in the histogram.

Figure 9:
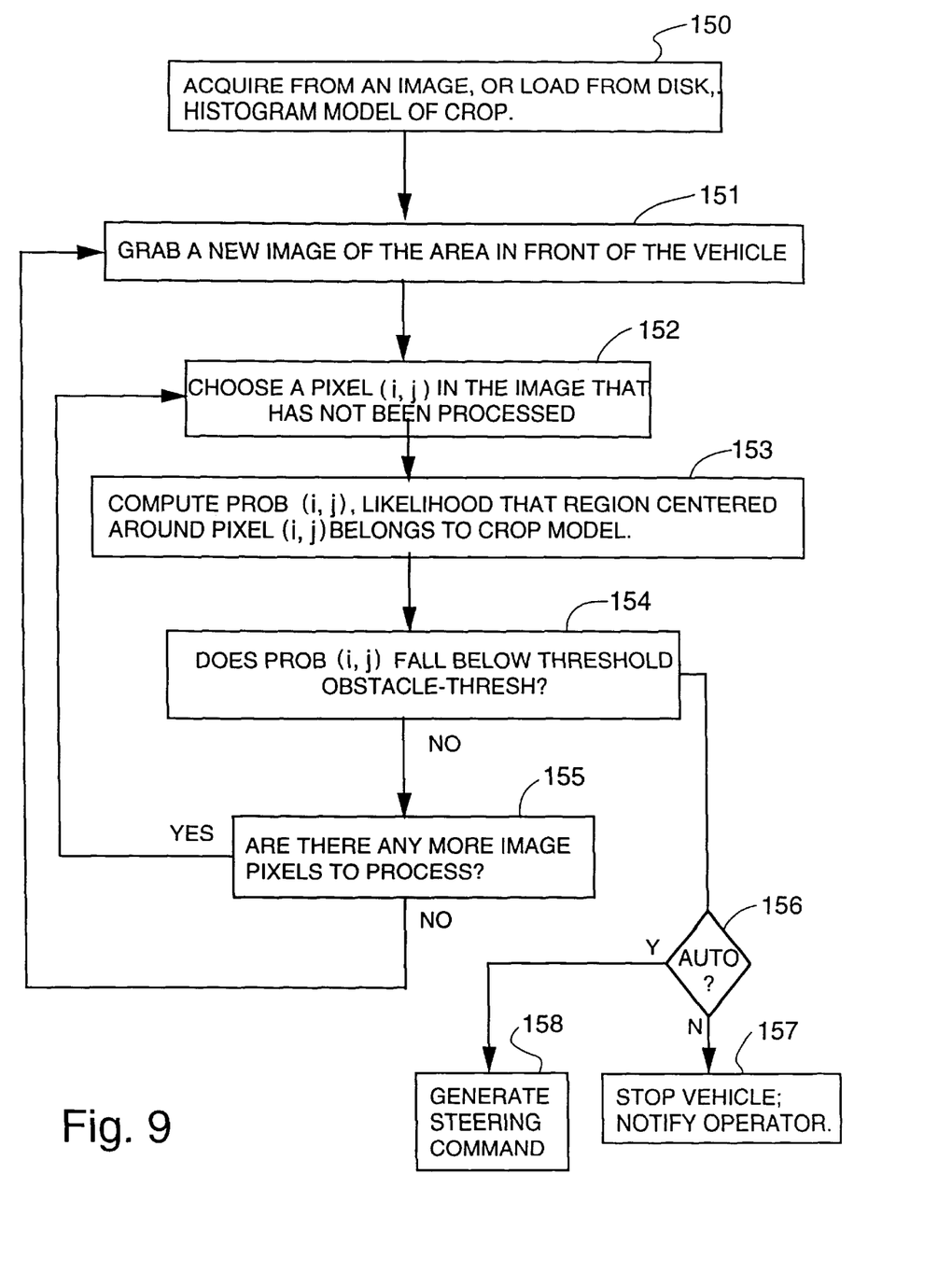
FIG. 9 is a flow chart illustrating the operation of the Obstacle Avoider module.

Step 154 compares the computed probability with a threshold value OBSTACLE_THRESH which is typically on the order of 10 to 200 and if the probability is not less than the threshold value it means that crop is being detected. Step 155 determines if the pixel just processed is the last pixel in the frame or image to be processed. If it is not, steps 152–155 are repeated. If step 155 determines that the last pixel of the image has been processed then the obstacle avoider returns to step 151 to obtain a new image for analysis.

If any execution of step 154 determines that PROB(i,j) falls below the threshold value OBSTACLE$_{13}$ THRESH then an obstacle has probably been detected. If not operating in the automatic guidance mode (step 156) the harvester is stopped by, for example, sending a signal to PCC 50 to control the harvester throttle control 36 (step 157). The operator may be notified by sending a command to PCC 50 to control the sounding of an alarm (not shown) and/or provide a visual warning. If the harvester is being operated in the automatic guidance mode then steering votes are generated (step 158) and supplied to the Steering Arbiter module 114. The steering votes generated at step 158 are similar to the steering votes produced by the crop line tracker in that there are 201 votes, one for each possible steering direction. However, one or more of the votes may be a veto vote having a value of −1.0. As subsequently explained, a veto vote on a given steering direction prevents the Steering Arbiter from generating a command to steer in that direction. Because the video cameras 42,44 are calibrated, the direction of each point in the camera field of view, relative to the current steering direction, is known from the pixel position where the point is imaged on the camera screen. Thus, if a pixel chosen at step 152 (FIG.9) results in a determination (step 154) that an obstacle is imaged on that pixel, the obstacle avoider computes what steering directions would cause the harvester to converge on the point imaged on that pixel. The obstacle avoider then inserts a veto vote in the bins corresponding to these steering directions when it generates the steering votes at step 158.

End of Row Detector.

The End of Row Detector module 104 detects when the harvester is near the end of a row and, when the GPS system is not functioning, provides a trigger message to the Execution Monitor module 100 indicating that the end of a crop row is near. The ERD module 104 also provides an indication of the distance between the current harvester position and the end of the row. When the end of row boundary is approximately perpendicular to the crop line and the cameras are mounted for zero roll, the distance to the end of the row is purely a function of the image row where the crop line boundary stops.

The ERD module 104 is turned on by the EM module 100 when module 100 reaches state 6. When turned on, it resets a counter N (step 242 in FIG. 10), grabs an image of the area in front of the harvester (step 243) and removes shadow noise from the image as described above with respect to the Crop Line Tracker module. Module 104 then determines (step 244) the most likely end of row. The ERD module 104 determines the image row or scan line i which most likely separates those scan lines containing a crop line boundary, that is, a boundary between cut and uncut crop, from those scan lines which do not contain a crop line boundary. At step 244, the ERD module analyzes each scan line according to the crop line best fit algorithm described with reference to the Crop Line Tracker module 102. The location and height of the resulting best fit step functions are compared to precomputed ranges stored in a memory in VPC 48 and derived from training data. If they fall within the allowed ranges, the boundary or step is accepted as a genuine indication of a crop line and the scan line is assigned a "beforeEnd" label. If no crop line is found, the scan line is assigned an "afterEnd" label.

Figure 10:
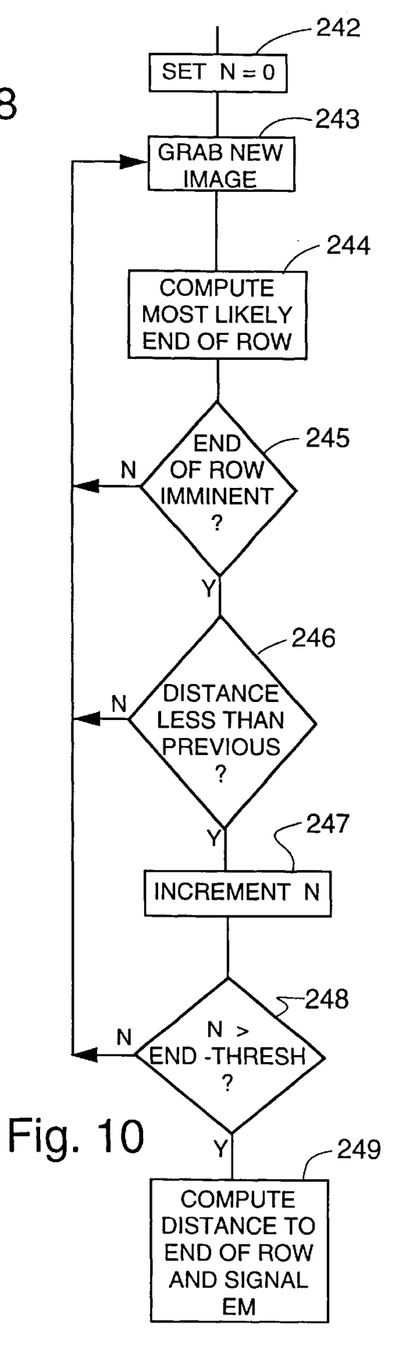
FIG. 10 is a flow chart illustrating the operation of the End of Row Detector module.

After a complete image has been scanned, a score S(i) is computed for each scan line by (1) setting S(i)=0, (2) incrementing S(i) for every scan line x from 0 (the top of the image) to line i−1, if the scan line has been assigned an "afterEnd" label, and (3) incrementing S(i) for every scan line y from i+1 to $i_{13}$ MAX (the bottom of the image) if the scan line has been assigned a "beforeEnd" label. The scan line with the highest score S(i) is the scan line which is imaging the end of the row. From the camera calibration data, the distance between the current harvester position and the end of the row may then be determined.

As a precaution against triggering a false end of row message, the computed distance is compared (step 245) with a stored distance value to determine if the end of row is eminent. If the computed distance is greater, the module does not send a triggering message to EM 100 but saves the computed distance and loops back to step 243 to grab and process a new image. Steps 243–245 are repeated until, at step 245, the computed distance is equal to or less than the stored distance value. When this occurs the computed distance for the present image is compared (step 246) with the distance value computed for the preceding image.

To prevent a spurious image from triggering a false end of row message, the ERD module does not send a triggering message until it processes a plurality of images and finds that for N (say 3) images the computed distance for each succeeding image is less than the computed distance for the preceding image.

If step 246 determines that the computed distance for the present image is not less than that computed for the previous image, the program returns to step 243 to process another image. On the other hand if step 246 determines that the computed distance is less than that computed for the preceding image, counter N is incremented (step 247) and compared (step 248) with the value $END_{13}$ THRES (assumed to have a value of 3). If N is less than or equal to 3, the program loops back to step 243, but if it is greater than 3, a trigger message is sent (step 249) to the EM module 100, this message having in it the distance to end of row value computed for the last image processed.

The reliability of the subsystem described above may be improved by providing a second subsytem in the form of a crop line assessor similar to the beginning of crop detector provided in the Crop Line Tracker module 102. However, rather than evaluating the regression lines from top to bottom, the lines are evaluated from the bottom to the top with the bottom subsection always being considered as non-skewed. A possible end-of-row is considered to occur at the starting point (bottom of line) of the lowest skewed line.

The possible end-of-row position outputted by the first subsystem is correlated with that of the second and a triggering message is sent to the EM module 100 only when the two outputs agree (and GPS data is currently unreliable or unavailable.

Arbiter.

One purpose of Steering Arbiter module 114 is to resolve conflicts between two or more modules which simultaneously wish to steer the harvester.

Figure 11:
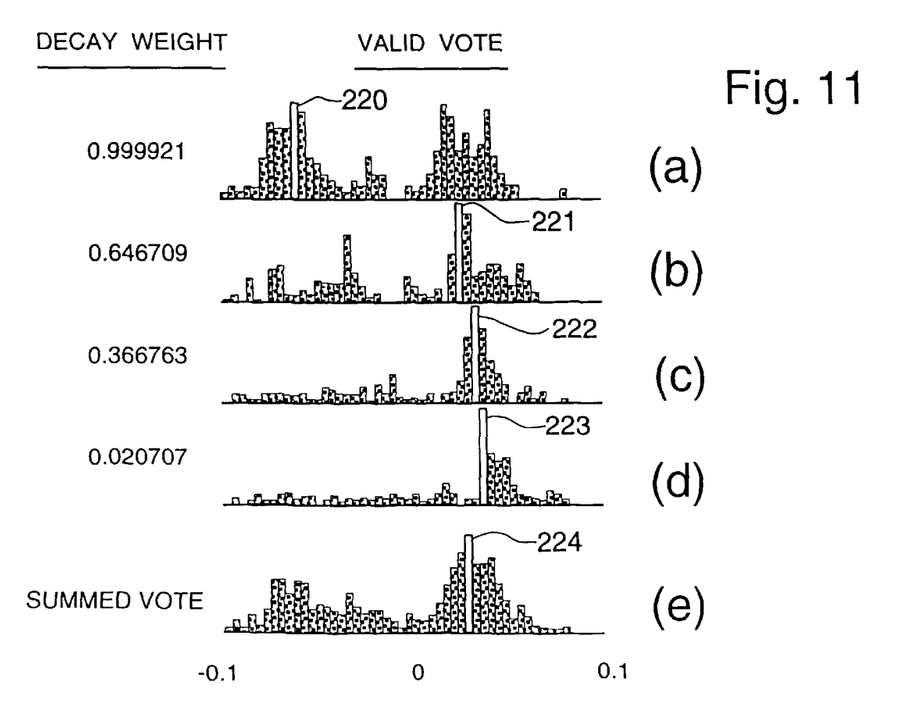
FIG. 11 comprises graphs illustrating the effect of time weighting and averaging Crop Line Tracker steering signals by the Steering Arbiter module.

The arbiter also performs a smoothing or filtering function on the steering direction votes produced by the various modules. This function may explained with reference to FIG. 11 which illustrates a typical situation for the case of a poor crop. The figure has been drawn for the case of less than 201 steering directions to more clearly demonstrate the smoothing function. In FIG. 11, assume that graphs (a)–(d) represent the vote counts produced by the CLT module 102 for four successive images, graph (a) being for the most recent image. Each vertical bar in a graph represents the vote count in one of the bins, that is, the accumulated vote count for one bin as developed by the CLT module 102 at step 127 in FIG. 8 and before the vote counts are normalized. In each graph, the vote for each image have been time weighted by a factor as indicated to the left of each graph.

In graph (a), the bin or steering direction referenced 220 has the highest vote sum hence if the votes derived from this image alone are considered, the harvester would be commanded to make a rather extreme turn to the left because this bin is separated from the "straight ahead" bin, represented by 0, by about 15 bins. On the other hand, for the preceding three images the vote summations for the bins referenced 221, 222 and 223 are the greatest hence if the vote summations for these images were acted on alone, the harvester would be commanded to steer gently to the right by slightly varying degrees.

The vote summations in graph (a) obviously resulted from some anomaly and would cause an undesirable left steer if acted on alone. To avoid such an action, the vote summations for several images are saved and decayed in value over time and the decayed vote summation values are then added together. Graph (e), which is not to the same scale as graphs (a)–(d) shows the result. By time weighting and summing the normalized vote counts in corresponding bins for the four images, the bin referenced 224 has the largest sum. Thus, by considering the votes over four images, the erroneous steering indication represented in graph (a) may be filtered or averaged out and the harvester commanded to steer slightly to the right even though analysis of the most recent image indicates that a hard left steer is needed.

Figure 12:
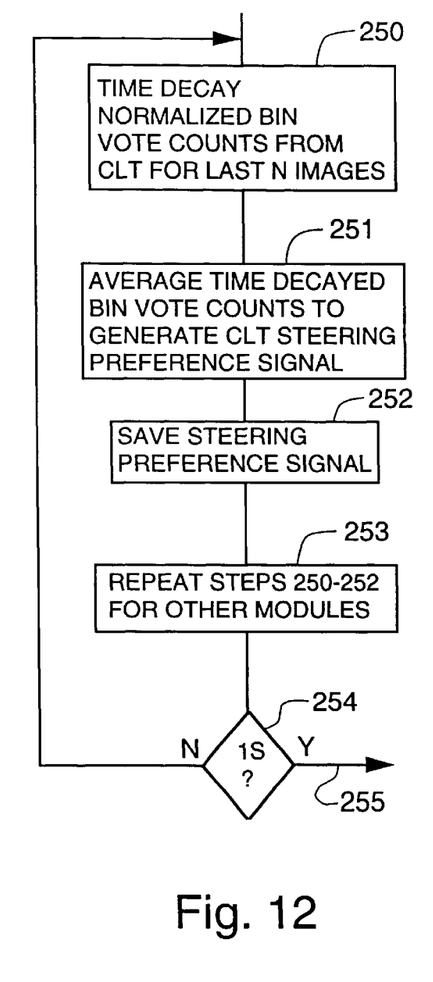
FIG. 12 is a flow diagram of operations performed by the Steering Arbiter on module steering signals to develop steering preference signals; and, FIG. 13 is a diagram illustrating operation of the Steering Arbiter to develop a steering command in response to steering preference signals from two modules.

Referring to FIG. 12, at step 250, the Steering Arbiter module 114 time weights or decays each of the 201 normalized bin vote counts for the last n images processed by crop line tracker 102. Although FIG. 11 illustrates the summation of votes for n=4 images, n may be any fixed number or the number of images processed by the crop line tracker 102 within a fixed interval of say 1 or 2 seconds.

Step 251 averages the decayed normalized bin vote counts obtained at step 250 to generate a steering preference signal for the crop line tracker. From the foregoing description it is evident that the steering preference signal comprises 201 bins or values, each value being between 0.0 and 1.0 and the total of all values being 1.0. The crop line tracker steering preference signal is then saved at step 252.

Next, the arbiter time decays and averages the bin vote counts produced by modules other than the CLT module 102 to develop steering preference signals for these modules. The time rate of decay of the bin vote counts from these modules need not be the same as for the bin vote counts from the CLT module. Furthermore, the bin vote counts may be averaged over more or fewer images than used in averaging the crop line tracker vote counts. The time rate of decay and the number of images taken into account in the averaging processed is dependent on the importance of a module to the overall steering operation and the frequency at which the module can process images.

The time decaying of the bin vote summations (step 250) and the summing of the decayed bin vote summations for several images (step 251) provides an advantage which is not readily apparent from the foregoing description. The various modules generate bin vote summations at different rates, for example 2 Hz or 5 Hz, and steering commands are generated by SA module 114 at a 10 Hz rate. This would result in quick changes in the steering command if the bin vote summations for prior images was not taken into account.

After step 253 is completed, step 254 checks a timer to see if .1 second has elapsed. If step 254 determines that 0.1 second has not elapsed since generation of the last steering command, steps 250–253 are repeated. After 0.1 second the test at step 254 proves true and the SA module produces a steering command as subsequently described.

As previously noted, one purpose of SA module 114 is to resolve conflicts when two or more modules simultaneously wish to control the same harvester function. The arbiter in this case generates a steering command which is a compromise between the conflicting desires of the two modules.

Figure 13:
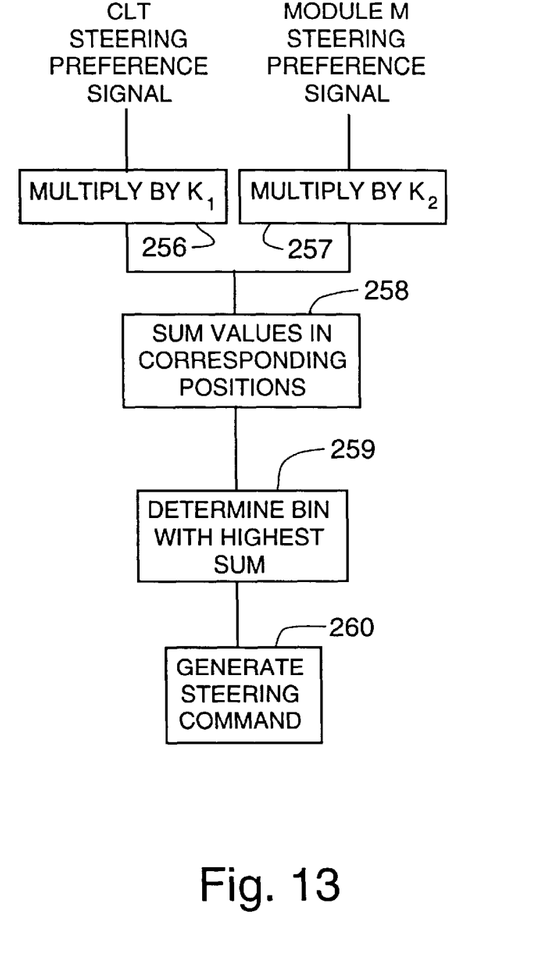

In FIG. 13, the steering preference signals for each module (generated at steps 252 and 253 in FIG. 12) are weighted according to the importance of the module by multiplying each steering preference signal by a constant value. For example, the value in each bin of the crop line tracker steering preference signal is multiplied by a constant $k_1$ at 256 and the value in each bin of the steering preference signal for module M is multiplied by a constant $k_2$ at 257. The values in corresponding bins of the weighted preference signals are then added together at step 258. Step 259 examines each of the 201 bin totals obtained at step 258 and determines which bin has the largest total. The arbiter then generates (step 260) a steering command having a value which depends on the position of the bin found to have the largest total.

As an example, assume that the harvester transmission 50 is capable of steering in one of 5 directions. Assume further that the crop line tracker and module M (either the LTT module 106, GTT module 106, or GTT module 108) steering preference signals, after weighting at 256 and 257, have the values 0.6, 0.4, 0, 0,0 and 0.1, 0.6, 0.1, 0.1, 0, respectively. The steering preference signal for the crop line tracker indicates a preference for a hard left steer (0.6) but a slight left turn (0.4) is acceptable. On the other hand, the steering preference signal for module B indicates a preference for a slight left turn (0.6). After summing of corresponding bin positions at step 258, the bin totals are 0.7, 1.0, 0.1, 0.1, 0.1. Step 259 determines that the second bin from the left has the highest total (1.0) so at step 260 a steering command is generated to cause a slight turn to the left.

As previously explained, the steering direction votes produced by the Obstacle Avoider module for each image contain veto votes (−1) in any bin associated with a steering direction which would steer the harvester on a collision course with a detected obstacle. In the SA module, these veto votes may be used in different ways to inhibit the generation of a command to steer along the collision course. For example, at step 258 of FIG. 13, the veto votes may inhibit the summing of values in those bin positions corresponding to the bin positions containing veto votes, or at step 259 the veto votes may exclude from the determination of the bin with the highest vote total those bins corresponding to the bins having veto votes therein.

The steering commands produced by the Steering Arbiter module at step 260 are transferred from the Task Management Computer 52 to the Physical Control Computer 50. PCC 50 resolves the commands and generates analog signals which control valves in transmission 35 so that the wheel drive motors are differentially driven to steer the harvester in the commanded direction. A steering command is generated once each 0.1 sec when the test at step 254 (FIG. 12) proves true. After each steering command is generated the arbiter returns to step 250.

From the foregoing description it is evident that in one embodiment the present invention provides a robotic control system capable of replacing an operator in controlling all functions of a harvester. The control program does not have to be changed in order to accommodate fields of different sizes or shapes because the path of harvester travel and other functions are specified in a field coverage plan that is planned within the system. An alternative embodiment provides a cruise control which relieves the operator of the responsibility of steering the harvester along a crop line but leaves all other functions under operator control.

While the invention has been described with respect to control of a harvester, it will be understood that various aspects of the invention are readily adapted for use in the control of other machines or vehicles, both agricultural and non-agricultural.

What is claimed is:

1. A robotic control system for an agricultural harvester, the robotic control system comprising an execution monitor module which is sequenced through a plurality of finite states by trigger messages from a field coverage planner module, a global trajectory tracker module, a controller module, an end of row detector module and a field coverage monitor module, the execution monitor module activating at least one of the field coverage planner module, the global trajectory tracker module, the end of row detector module, a crop line tracker module or a local trajectory tracker module in each finite state so as to generate steering signals for steering the harvester along a path specified by a field coverage plan to cut all crop in a field.

2. A robotic control system as claimed in claim 1 wherein said global trajectory module generates steering votes indicating the preferred direction the harvester should be steered so as to follow said path and said crop line tracker module generates steering votes on the direction the harvester should be steered to follow a crop line between cut and uncut crop, the system further comprising a continuously running steering arbiter module for developing steering commands from all the steering votes and a continuously running controller responsive to the steering commands for developing signals to differentially drive front wheels of the harvester to steer it.

3. A robotic control system as claimed in claim 1 wherein said crop line tracker module generates, for each image, steering votes on the direction the harvester should be steered to follow a crop line between cut and uncut crop, the system further comprising a continuously running steering arbiter module for developing a steering command from all the steering votes, and a continuously running controller responsive to the steering commands for developing signals to differentially drive front wheels of the harvester to steer it.

4. A robotic control system as claimed in claim 3 wherein, in developing the steering commands, the votes from the crop line tracker module are weighted differently from the votes from the global trajectory tracker module.

5. A robotic control system as claimed in claim 1 and further comprising at least one video camera mounted on the harvester for viewing the changing scene in front of the harvester and producing images thereof as the harvester moves along the planned path, the crop line tracker module compensating the images for shadows in the scene and deriving, from each compensated image, steering votes for steering the harvester along a crop line between cut and uncut crop.

6. A robotic control system as claimed in claim 5 wherein said steering votes are time decayed over N images to produce a steering preference signal.

7. A robotic control system as claimed in claim 1 and further comprising at least one video camera mounted on the harvester for viewing the changing scene in front of the harvester and producing images of the changing scene as the harvester moves along the planned path, said end of row detector module scanning each line of an image to determine if a crop line boundary is indicated in the line, and, from the determination of which lines indicate a crop line boundary and which lines do not, determining the most likely line imaging the end of a crop row.

8. A robotic control system for a harvester, including at least one video camera mounted on the harvester for viewing the changing scene in front of the harvester and producing images of the changing scene as the harvester moves along the planned path, and a crop line tracker module for analyzing each of the images according to an adaptively updated color discriminant function to derive steering votes for steering the harvester along a crop line between cut and uncut crop.

9. A robotic control system as claimed in claim 8 wherein said crop line tracker module includes:
   a discriminator for analyzing each pixel of each line of each produced image and assigning a discriminant value to each said pixel; and
   a segmenter for computing a best fit step function for the pixels of each line and defining a selected pixel in each line to represent the location of the crop line.

10. A robotic control system as claimed in claim 8 wherein, after each image is analyzed, the crop line tracker module computes the Fisher linear discriminant in RGB space between the cut and uncut crop as the discriminant for the next image.

11. A robotic control system for a harvester, including at least one video camera mounted on the harvester for viewing the changing scene in front of the harvester and producing images of the changing scene as the harvester moves along the planned path, and an end of row detector module scanning each line of an image to determine if a crop line boundary is indicated in the line, and, from the determination of which lines indicate a crop line boundary and which lines do not, determining the most likely line imaging the end of a crop row.

12. A robotic control system as claimed in claim 11 wherein said end of row detector module computes a computed distance from a current harvester position to determined position corresponding to a most likely end of row position, said computed distance being compared with a stored distance value, said end of row detector module processing a new image and determining a new determined position from which a new computed distance is computed whenever said computed distance is greater than said stored distance.

13. A robotic control system as claimed in claim 12 wherein said end of row detector module continues to process new images and determine new determined positions until the new computed distance is less than or equal to said stored distance for a predetermined number of computed new determined positions.

14. A method of harvesting crop material with a crop harvesting machine having a robotic control system, comprising the steps of:

providing an execution monitor module which is sequenced through a plurality of finite states by trigger messages from a field coverage planner module, a global trajectory tracker module, a controller module, an end of row detector module and a field coverage monitor module; and activating at least one of the field coverage planner module, the global trajectory tracker module, the end of row detector module, a crop line tracker module or a local trajectory tracker module in each finite state so as to generate steering votes for steering the harvester along a path specified by a field coverage plan to cut all crop in a field.

15. A method of harvesting crop material as claimed in claim 14, further comprising the steps of:

generating steering votes from at least said global trajectory module, which indicates the preferred direction the harvester should be steered so as to follow said path, and said crop line tracker module which defines a crop line between cut and uncut crop along which the harvester should be steered;

arbitrating said steering votes by a continuously running steering arbiter module for developing steering commands from all the steering votes and a continuously running controller responsive to the steering commands for developing signals to differentially drive front wheels of the harvester to steer it; and steering said crop harvesting machine in response to said steering commands.

16. A method of harvesting crop material as claimed in claim 15, further comprising the steps of:

weighting said steering votes in said arbitrating step such that said steering votes from said crop line tracker module are weighted differently than the steering votes from said global trajectory tracker module.

17. A method of harvesting crop material as claimed in claim 16, further comprising the steps of:

producing images from at least one video camera mounted on said harvesting machine to be indicative of the changing scene in front of said harvesting machine as said harvesting machine moves along a steering path;

compensating the images for shadows to create compensated images; and deriving from said compensated images said steering votes for said crop line tracking module to steer said harvesting machine along a crop line between cut and uncut crop material.

18. A method of harvesting crop material as claimed in claim 17 wherein said deriving step includes the step of:

analyzing each of said images according to an adaptively updated color discriminant function to define said crop line between cut and uncut crop material.

19. A method of harvesting crop material as claimed in claim 17, further comprising the steps of:

scanning each line of each image by said end of row detector module to determine if a crop line boundary is indicated; and determining from an analysis of each scanned line the most likely line imaging the end of a crop row.

* * * * *